2,702,781
// Patented Feb. 22, 1955

2,702,781

METHOD OF PRODUCING STREPTOKINASE AND STREPTODORNASE

Samuel R. Hawkins, Pearl River, N. Y., assignor to American Cyanamid Company, New York, N. Y., a corporation of Maine No Drawing. Application June 8, 1951, Serial No. 230,699

8 Claims. (Cl. 195—65)

This invention relates to improvements in the art of producing enzymes. More particularly the present invention is concerned with improvements in the methods by which certain species of streptococci are caused to produce beneficial enzymes in a fermentation medium.

In recent years considerable interest has developed in the lysis of certain materials with enzymes and among the enzymes receiving the most attention are streptokinase and streptodornase. Mixtures of streptokinase and streptodornase have shown utility in the experimental treatment of certain burns, in the drainage of purulent sinuses, in the treatment of chronic infected bone abscesses or osteomyelitises, in the drainage of clotted blood from internal wounds, and in the drainage of the block in the spinal column occurring in various types of meningitis. More generally, mixtures of these two enzymes are useful in the treatment of empyema, hemothorax, hematoma and chronic suppurative infections.

Mixtures of streptokinase and streptodornase are produced by certain bacteria when grown in various media. The most frequently employed bacteria are the beta hemolytic streptococci and especially those of the Lancefield groups A, "human" C, and G. Best results have so far been obtained from the C group as these bacteria grow well under less strictly controlled conditions and produce smaller quantities of by-products. The fermentation procedure generally comprises inoculating with seed bacteria a fermentation medium comprising a source of basic nitrogen and allowing the bacteria to grow under aerobic conditions.

In order to induce bacteria of the above types to produce the maximum amounts of streptokinase and streptodornase it is necessary that they be grown through part of their fermentation period in the presence of large amounts of a sugar. The introduction of this sugar into the fermentation medium has been a source of trouble in the past and involves two very serious problems. In the first place, it is the general rule that if the constitution of a fermentation medium is changed radically, it interrupts the growth of the bacteria and an acclimation period is necessary before normal growth continues. Therefore, when large amounts of a sugar are added to a fermentation medium in which streptokinase and streptodornase producing bacteria are being grown, the sudden change in surroundings causes a temporary interruption in normal growth. The second problem concerns the production of acid by the bacteria. When streptokinase and streptodornase producing bacteria are allowed to grow in a medium containing large amounts of a sugar they produce an acid which inhibits their further growth. Both of these problems have been met in the prior art by allowing a waiting period of about 10 hours before any large amounts of sugar were added and during which time the bacteria were grown in a medium containing only very small amounts of sugar. During this waiting period the bacteria increased rapidly and reached concentrations as high as about $30 \times 10^9$ per cc. of medium, or in other words very near to the maximum which can be obtained under almost any conditions. Thus, when large sugar additions were made to the medium, great numbers of bacteria were already present and as a result, satisfactory amounts of streptokinase and streptodornase were obtained even though the sugar additions interfered to some extent with the further rapid growth of the bacteria. The procedure has the disadvantage of requiring a very long fermentation period. By the procedure of this invention it is not only possible to eliminate the waiting period but it is also possible to obtain remarkably superior results.

The procedure of this invention comprises adding all of the necessary sugar to the medium before the fermentation has proceeded for a period of about 10 hours and at least 8% of the sugar before the fermentation has proceeded for a period of 4 hours. A preferred procedure comprises adding all of the sugar before the fermentation is even begun.

This new procedure has many advantages. First, it eliminates the time consuming waiting period with a resulting increase in daily production and savings in cost. The new procedure also results in a saving of basic nitrogen material. The most important advantage, however, is the surprising fact that much greater yields of streptokinase and streptodornase per cc. of medium are obtained. This is truly unexpected. One possible explanation would appear to be that once acclimated to a medium containing large amounts of sugar, the bacteria grow as well as previously and produce streptokinase and streptodornase while doing so. In fact, it would appear that the bacteria grow more readily in a medium containing a high sugar concentration, as long as the acid formed is removed by neutralization, than in a medium which is low in sugar for the new procedure of this invention results in higher final bacteria counts.

The increased yield of enzymes is of importance not only from an economy point of view but for other reasons as well. Not among the least of these is the ease with which a relatively pure product can be obtained from a fermentation solution of higher relative concentration. This is a result of the purification procedures available and necessary for separating the enzymes from the other constituents of the fermentation medium for these purification procedures are of such a nature that they become increasingly less efficient as the relative concentration of the enzymes decreases.

The following table lists the results of two fermentations under comparable conditions except that in one a waiting period of about 10 hours was allowed according to the procedure of the prior art and in the other, sugar additions were started soon after inoculation. In all tests the fermentation medium employed was the same. The sugar employed in each instance was glucose and the amount employed was based upon the amount of alkali required to maintain the pH of the medium within the operating range.

*Table I*

|  | No Waiting Period Allowed | Waiting Period Allowed |
|---|---|---|
| Hrs. of growth | 7 | 24. |
| Sugar | 15 liters of 50% glucose | 9 liters of 50% glucose. |
| Streptokinase | 1,400 units/cc | 600 units/cc. |
| Streptodornase | 620 units/cc | 290 units/cc. |

From the above it will be seen that while the new procedure of this invention required a fermentation period of less than one third that of the prior art, over twice the yield of enzymes was obtained.

Any of the common types of sugars may be employed including monosaccharides and polysaccharides. The choice is usually determined by convenience and economy. Among the disaccharides which may be employed are sucrose and maltose and among the monosaccharides which may be employed are glucose and mannose. The total amount of sugar which may be advantageously added during the fermentation varies within relatively wide limits, for instance from about 1500 to about 4000 parts by weight per 1000 parts of basic nitrogen material. A reasonable excess of sugar is not detrimental as was previously supposed and one may use as high as 5000 to 6000 parts per 1000 parts of basic nitrogen material if desired, although such practice is not recommended for reasons of economy. The optimum amount of sugar to be employed depends upon a number of factors but is usually between 2000 to 3000 parts by weight of sugar for each 1000 parts of basic nitrogen material. A quite satisfactory procedure for determining a near optimum amount comprises determining the quantity of base, calculated as equivalent volume of 5.0 N sodium hydroxide, required to maintain the medium within a satisfactory operating pH range and adding from 110% to 125% of this volume of a 50% sugar solution or the equivalent.

For the most satisfactory results, the sugar additions should be started as near the beginning of the fermentation as possible; however, once the bacteria are growing in the presence of large amounts of sugar, a careful check must be maintained on the pH of the medium as it tends to become acidic very rapidly. The pH of the medium should not be allowed to go below pH 6.0 and preferably not below pH 6.5. A highly satisfactory procedure comprises adding a base when the pH drops below about pH 6.7 so that the pH is raised to about pH 7.5. Care should be exercised, however, not to raise the pH above about pH 8.5 and preferably not above about pH 8.0 as higher pH's tend to inhibit the growth of the bacteria. In fact, if the pH is raised above about pH 9.0, not only will the growth of the bacteria be inhibited but the streptokinase already formed will be irreversibly inactivated. The temperature of the fermentation liquor is also important and should be maintained at about 32° C. to 40° C. and preferably at about 36° C. to 38° C.

The fermentation should be continued for a period of at least three hours after the first addition of sugar or until the concentration of streptokinase reaches a minimum of about 300 units per cc. of medium. Of course, as a general rule, the fermentation should be continued until the concentration of streptokinase and streptodornase ceases to increase or in other words for 4 to 8 hours after the first sugar addition, because one is usually interested in obtaining the maximum amount of enzymes per cc. of medium. Time will be saved by ending the fermentation as soon as this maximum concentration of enzymes has been obtained; however, after this maximum has been reached the concentration decreases only very slowly and, therefore, a prolonged fermentation period is not unduly detrimental. For this reason it will sometimes be convenient to allow the fermentation to continue overnight or up to a maximum of about 16 hours.

As mentioned above, a preferred embodiment of this invention comprises adding all of the sugar to the fermentation medium before it is inoculated with the bacteria. Prior to this invention it was thought that a large excess of sugar in the medium at any time and especially at the start of fermentation would be detrimental because this would subject the bacteria to a severe change in conditions which would require an acclimation period before normal growth would continue. It is, therefore, quite surprising that such highly satisfactory results can be obtained by this procedure.

This preferred embodiment of the invention allows one to include the sugar with the other necessary ingredients in the preparation of the fermentation medium. In addition to a great saving in time and effort, this embodiment has the distinct advantage that it eliminates one sterile filtration in the course of the fermentation. By the old procedure a solution of the sugar was prepared separately and sterile filtered before being added to the fermentation medium but by the new procedure the unsterilized sugar may be added to the unsterilized medium and this mixture then sterilized before inoculation by a single filtration. In fact, it is only because of this advantageous procedure that it has been found to be practical to move from 100 gallon to 1000 gallon fermentations.

Many commercially available proteins or protein digests may be employed to furnish the basic nitrogen, for instance animal protein digest, casein digest, and plant protein digest. The essential requirement of the basic nitrogen source is that it furnish the necessary quantities in free or combined form of the well known essential aminoacids. The preferred source of basic nitrogen, especially if the fermentation is to be conducted on a large scale, comprises enzyme hydrolyzed casein and glycine as disclosed in copending U. S. application S. N. 230,696 filed concurrently herewith. The fermentation medium should also contain a sulfhydryl reducing agent such as thioglycolic acid, thiomalic acid or glutathione to maintain the medium in a reduced condition.

The amount of basic nitrogen material per unit volume of fermentation medium may be varied within relatively wide limits. If one is primarily interested in purity of product, low concentrations are recommended, for instance 2 to 6 parts by weight of basic nitrogen material per each 300 parts by volume of medium. This may be advantageous when one is concerned with producing material to be used in intravenous injections. On the other hand, if one is interested in highest total yield of streptokinase per unit of basal nitrogen employed, relatively high concentrations are recommended, for instance 10 to 20 parts by weight of basic nitrogen material per each 300 parts by volume of medium. The amount of organic sulfhydryl reducing agent employed in the fermentation mixture may also be varied within wide limits, for instance from 0.01 to 0.5 molecular weight (mols if the weight of the basic nitrogen material is in grams) of sulfhydryl reducing agent per 1,000 parts by weight of basic nitrogen material. The optimum ratio has been found to be .03 to .07 molecular weight per 1,000 parts by weight of basic nitrogen material.

In addition to the above materials, various other ingredients may often be advantageously added to the fermentation medium. These additional agents are referred to as "growth promoting ingredients" and include such things as vitamins, minerals, aminoacids, and trace elements. The following table lists a number of such materials as well as recommended amounts which are often advantageous.

Table II

| Growth Promoter | Parts by Weight Per Each 1,000 Parts Of Basic Nitrogen Material |
|---|---|
| $KH_2PO_4$ | 80–160 |
| $KHCO_3$ | 50–100 |
| Uracil | 0.2–0.6 |
| Adenine Sulfate | 0.2–0.6 |
| Nicotinic Acid | .02–.06 |
| Pyridoxine | .03–.07 |
| Tryptophane | 0.4–1.0 |
| Calcium Pantothenate | 0.1–0.3 |
| Thiamin Hydrochloride | .05–.15 |
| Riboflavin | .01–.03 |
| Cystine | 2–6 |

Trace elements are usually added in the form of a salt mixture to furnish very slight amounts of the ions of such metals as iron, magnesium, copper, zinc, etc. It will often be found convenient to prepare a "salt mixture" from the salts of metals such as the above and add a small quantity of the mixture to each fermentation. The following table gives the composition of a salt mixture which has been found to be satisfactory by applicants when employed in amounts of 40 to 150 ml. per kg. of basic nitrogen material.

Table III

| Material: | Amount |
|---|---|
| $MgSO_4$ | kg.. 11.5 |
| $CuSO_4.5H_2O$ | kg.. .05 |
| $ZnSO_4.7H_2O$ | kg.. .05 |
| $MnCl_4.4H_2O$ | kg.. .02 |
| $FeSO_4.7H_2O$ | kg.. .05 |
| HCl | liter.. 1.0 |
| Water q. s. to make 100 liters. | |

A convenient way of preparing the fermentation medium may be illustrated by the following steps: dissolve the desired quantity of basic nitrogen material in about five times its weight of hot water; sterilize by autoclaving or filtering; add sterile solutions of the sulfhydryl reducing agent and of the growth promoting materials; and adjust the pH to about 7 to 8. The medium is then ready for inoculation. If the medium is sterilized by filtration, all of the ingredients may be added before sterilization. If sterilization is by filtration, it is sometimes advantageous for purity of product to cool the medium to 20° C. or lower before filtering; however, if maximum yield is of prime importance, this is not recommended.

The seed inoculum is prepared by suspending a dried culture of the bacteria in a few liters of a medium such as the above and containing in addition about 20 to 70 parts by weight of a sugar per 1000 parts of basal nitrogen and growing the seed at a temperature of 35°–39° C. for about eight hours so that the bacterial count is from about $2 \times 10^9$ to $2 \times 10^{10}$ per cc. A volume of this inoculum is then employed to seed the fermentation medium so as to provide an original bacterial count of about $6 \times 10^7$ to $8 \times 10^8$ per cc.

The invention will be more particularly illustrated by the following examples in which all parts are by weight unless otherwise indicated:

Example I

A fermentation medium was prepared containing the following ingredients:

| Ingredient | Unit | Amount |
|---|---|---|
| Hydrolyzed casein ("N-Z-Amine") | g | 10,169.0 |
| KH₂PO₄ | g | 1,165.0 |
| Cystine | g | 35.0 |
| Glycine | g | 35.0 |
| Dextrose | g | 300.0 |
| Uracil | g | 3.5 |
| Adenine sulfate | g | 3.5 |
| Nicotinic acid | g | 0.35 |
| Pyridoxine | g | 0.595 |
| Tryptophane | g | 3.5 |
| Calcium panthothenate | g | 1.75 |
| Thiamin HCl | g | 0.875 |
| Riboflavin | g | 0.175 |
| Thioglycolic | ml | 52.5 |
| KHCO₃ | g | 700.0 |
| Salt solution (Table III) | ml | 700.0 |
| Distilled water, q. s. to make 350.0 liters. | | |

The hydrolyzed casein was dissolved in about 5 volumes of water and this solution was then sterilized by autoclaving. After cooling at room temperature, sterile solutions of the remainder of the ingredients were added and then the solution made to volume with sterile distilled water. The pH of the solution was adjusted to about 7.0 and the temperature adjusted to about 37° C. The medium was then inoculated with about 11.0 liters of seed containing about $16 \times 10^9$ beta hemolytic streptococci of Lansfield group C per cc.

The inoculation was performed at about 9:00 a. m. and the following table shows the time and amount of sugar and base added as well as the pH before and after addition. The sugar was added in the form of a sterile aqueous solution containing 50 gms. of sugar per each 100 cc. of solution. The number of units of streptokinase and the number of bacteria contained in 1 cc. of medium at various times are also given.

| Time | Ml of 5 N NaOH Added | Ml of 50% Dextrose Added | pH Before | pH After | SK Units/cc. | Bacteria Count in Billions/cc. |
|---|---|---|---|---|---|---|
| *A. m.* | | | | | | |
| 9:45 | | | 7.1 | | | |
| 10:10 | | | 6.9 | | | |
| 10:35 | 600 | 660 | 6.7 | 6.9 | | 12.1 |
| 11:00 | 1,500 | 1,650 | 6.4 | 7.05 | | |
| 11:25 | 800 | 880 | 6.6 | 6.9 | 234 | 18.0 |
| 11:45 | 2,500 | 2,650 | 6.4 | 7.5 | | |
| *P. m.* | | | | | | |
| 12:30 | 2,500 | 2,650 | 6.4 | 7.4 | | |
| 12:50 | 1,600 | 1,760 | 6.8 | 7.4 | 286 | 33.3 |
| 1:05 | 1,600 | 1,760 | 6.8 | 7.4 | | |
| 1:20 | 1,600 | 1,760 | 6.8 | 7.4 | | |
| 1:30 | 1,600 | 1,760 | 6.8 | 7.4 | | |
| 1:50 | 1,600 | 1,760 | 6.8 | 7.7 | 572 | 46.7 |
| 2:10 | | 800 | 6.9 | | | |
| 2:15 | 1,800 | 1,980 | 6.7 | 7.45 | | |
| 2:30 | 1,800 | 1,760 | 6.8 | 7.4 | 780 | |
| 2:45 | 1,800 | 2,200 | 6.7 | 7.5 | | 54.0 |
| 3:00 | 1,600 | 1,760 | 6.8 | 7.4 | 832 | |
| 3:20 | 1,600 | 1,760 | 6.8 | 7.5 | | |
| 3:40 | 1,800 | 2,200 | 6.7 | 7.45 | 1,170 | |
| 3:55 | 1,600 | 1,760 | 6.8 | 7.5 | | 57.7 |
| 4:15 | 1,600 | 1,760 | 6.8 | 7.55 | 1,450 | |
| 4:35 | 1,600 | 1,760 | 6.8 | 7.5 | | 65.2 |
| Totals | 30,900 | 35,030 | | | | |

At about 4:45 p. m. the bacteria were killed and the fermentation terminated.

Example II

A fermentation medium was prepared containing the following ingredients:

| Ingredient | Unit | Amount |
|---|---|---|
| Hydrolyzed casein ("N-Z-Amine") | g | 10,169.0 |
| KH₂PO₄ | g | 1,165.0 |
| Cystine | g | 35.0 |
| Glycine | g | 35.0 |
| Dextrose | kg | 22.5 |
| Uracil | g | 3.5 |
| Adenine sulfate | g | 3.5 |
| Nicotinic acid | g | .35 |
| Pyridoxine | g | .595 |
| Tryptophane | g | 3.5 |
| Calcium pantothenate | g | 1.75 |
| Thiamin HCl | g | .875 |
| Riboflavin | g | .175 |
| Thioglycolic acid | ml | 52.5 |
| KHCO₃ | g | 700.0 |
| Salt solution (Table III) | ml | 700.0 |
| Distilled water, q. s. to make 350.0 liters. | | |

The medium was prepared and inoculated as in Example I. The inoculation was performed at about 8:45 a. m. and the following table lists the time and amount of base additions as well as the number of units of streptokinase contained in 1 cc. of medium at various times.

| Time | Ml of 5 N NaOH Added | pH Before | pH After | SK Units/cc. | SD Units/cc. | Bacteria Count in Billions/cc. |
|---|---|---|---|---|---|---|
| *A. m.* | | | | | | |
| 9:25 | 600 | 6.75 | 7.1 | | | |
| 10:25 | 400 | 6.8 | 7.0 | | | |
| 10:50 | 600 | 6.7 | 7.05 | | | |
| 11:30 | 2,000 | 6.8 | 7.5 | | | 6.7 |
| 12:00 | 1,200 | 6.9 | 7.3 | 390 | | |
| *P. m.* | | | | | | |
| 12:25 | 1,500 | 6.75 | 7.45 | | | |
| 12:45 | 1,600 | 6.7 | 7.4 | | | |
| 1:15 | 2,000 | 6.5 | 7.4 | 1,300 | | 28.3 |
| 1:35 | 1,800 | 6.6 | 7.0 | | | |
| | 1,000 | | 7.5 | 2,370 | | |
| 1:55 | 1,400 | 6.8 | 7.4 | | | |
| 2:05 | 1,600 | 6.7 | 7.4 | | | |
| 2:20 | 1,400 | 6.8 | 7.4 | | | |
| 2:35 | 1,700 | 6.7 | 7.4 | | | 54.9 |
| 2:45 | 1,800 | 6.6 | 7.3 | | 1,000 | |
| Total | 20,600 | | | | | |

At about 3:00 p. m. the bacteria were killed and the fermentation terminated.

The above example illustrates the preferred modification of the method of this invention. Many fermentations have been made by the above procedure and streptokinase concentrations of about 2000 units per cc. have been consistently obtained. This compares to an average of about 600 to 800 units of streptokinase per cc. obtained by the methods of the prior art wherein a waiting period was allowed.

I claim:

1. In a fermentation process of producing mixtures containing streptokinase and streptodornase which comprises inoculating an aqueous medium containing a basic source of nitrogen with a strain of beta hemolytic streptococci and allowing the bacteria to grow at a temperature between 32° C. and 40° C., the improvement which comprises adding to said fermentation medium before the fermentation has proceeded for a period of 10 hours, between 1500 and 6000 parts by weight of a sugar for each 1000 parts by weight of basic nitrogen material in said medium, adding at least 8% of said sugar before the fermentation has proceeded for a period of 4 hours, and maintaining the pH of said medium between pH 6.0 and pH 8.5 during fermentation.

2. The improvement of claim 1 wherein the pH is maintained at between pH 6.5 and pH 8.0.

3. The improvement of claim 1 wherein said amount of sugar added before the fermentation has proceeded for a period of 4 hours is at least 160 parts by weight of sugar for each 1000 parts by weight of basic nitrogen material.

4. The improvement of claim 1 wherein said sugar is dextrose.

5. In a fermentation process of producing mixtures containing streptokinase and streptodornase which comprises inoculating an aqueous medium containing a basic source of nitrogen with a strain of beta hemolytic streptococci and allowing the bacteria to grow at a temperature between 32° C. and 40° C., the improvement which comprises adding to said fermentation medium, before inoculation, between 1500 and 6000 parts by weight of a sugar for each 1000 parts of basic nitrogen material in said medium and maintaining the pH of said medium between 6.0 and 8.5 during fermentation.

6. The improvement of claim 5 wherein the pH of said medium is maintained at between pH 6.5 and pH 8.0 during fermentation.

7. The improvement of claim 5 wherein said amount of sugar added before inoculation is between 2000 and 3000 parts by weight of sugar for each 1000 parts by weight of basic nitrogen material.

8. The improvement of claim 7 wherein said sugar is dextrose.

References Cited in the file of this patent

UNITED STATES PATENTS

| | | |
|---|---|---|
| 1,744,742 | Boidin et al. | Jan. 28, 1930 |
| 2,524,089 | Stubbs et al. | Oct. 3, 1950 |
| 2,530,210 | Smythe et al. | Nov. 14, 1950 |

OTHER REFERENCES

Christensen, Jour. Gen. Physiol., 1945, 28, page 363.

Porter, Bacterial Chemistry and Physiology, Wiley, 1946, pages 107–108, 115, 130, 693–695.